Aug. 19, 1969  J. HASSLER  3,462,187
DUMP BODY

Filed April 21, 1967  4 Sheets-Sheet 1

INVENTOR.
John Hassler
BY
E. J. Biskup
ATTORNEY

Aug. 19, 1969   J. HASSLER   3,462,187
DUMP BODY
Filed April 21, 1967   4 Sheets-Sheet 2

INVENTOR.
John Hassler
BY
E. J. Biskup
ATTORNEY

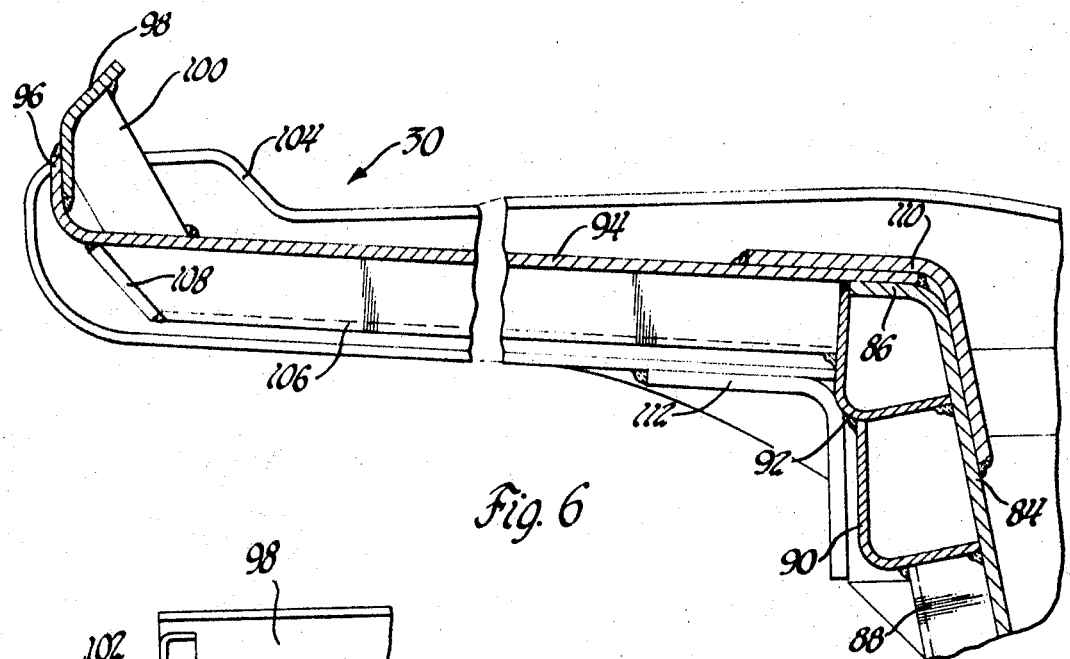
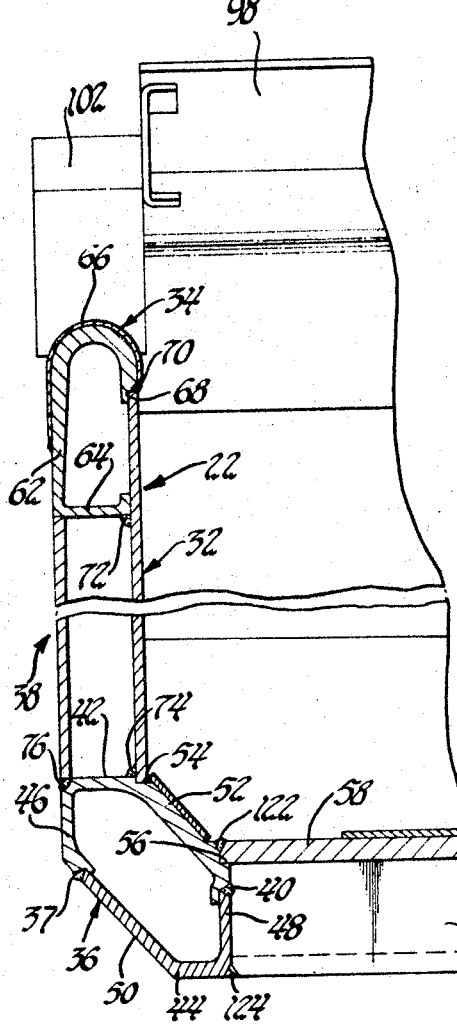
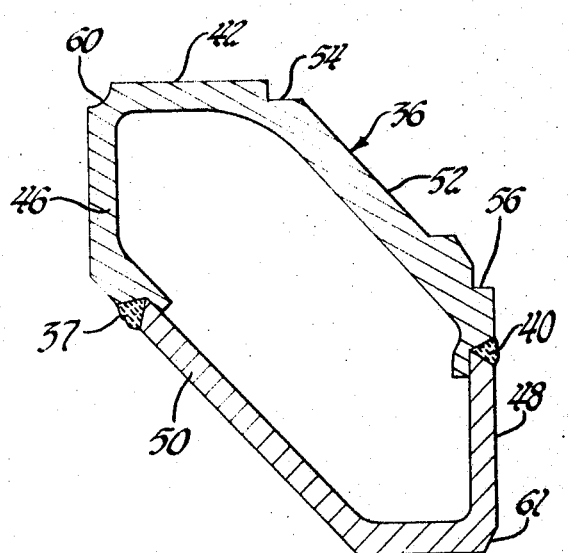

INVENTOR.
John Hassler
BY
E. J. Biskup
ATTORNEY

United States Patent Office 3,462,187
Patented Aug. 19, 1969

3,462,187
DUMP BODY
John Hassler, Cleveland, Ohio, assignor, by mesne assignments, to Euclid, Inc., a corporation of Ohio
Filed Apr. 21, 1967, Ser. No. 632,667
Int. Cl. B62d 27/00; B60p 1/00; B61d 17/00
U.S. Cl. 296—28                    11 Claims

ABSTRACT OF THE DISCLOSURE

A dump body for a vehicle wherein the side walls are joined to the floor by a longitudinally extending corner beam having locating surfaces formed therewith for accommodating and accurately positioning one end of the main plates associated with the side wall and floor.

---

It is common practice to make the hopper or dump body of a dump vehicle from steel plates welded together to form a rigid structure for supporting rock, quarry, sand or other materials. The methods presently used for manufacturing such bodies are considered to be relatively primitive in that the load body is built up on a job-shop basis utilizing complicated tooling and fixtures which require a large amount of plant space. Also, essentially all parts of the dump body are assembled by hand-welding operation which are both time consuming and expensive as opposed to such advanced techniques as automatic welding.

Accordingly, the objects of the present invention are to provide a load-retaining body for a vehicle that is durable in construction, simple to assemble, and inexpensive to manufacture; to provide a dump body that incorporates subassemblies which can be built in different localities for final assembly in a common plant; to provide a body for a dump truck constructed in a manner that lends itself well to automatic straight-line welding and, accordingly, high production output; to provide a dump body for a vehicle that incorporates extruded structural parts made from a lightweight metal and provided with locating surfaces for facilitating body assembly, and to provide a side wall construction for a load-retaining body that can be made as a subassembly and includes extruded sections made from metal and having locating surfaces for accurately accommodating the floor portion of the body.

Other objects and advantages of the present invention will be more apparent from the following detailed description when taken with the drawings in which:

FIGURE 6 is an enlarged sectional view taken on line 6—6 of FIGURE 2 and illustrates the details of construction of the cab guard;

FIGURE 7 is an enlarged sectional view of the corner beam which joins the side wall to the floor assembly prior to assembly;

FIGURE 8 is an enlarged sectional view taken on line 8—8 of FIGURE 1 and shows in details the side wall construction.

Figure 1:
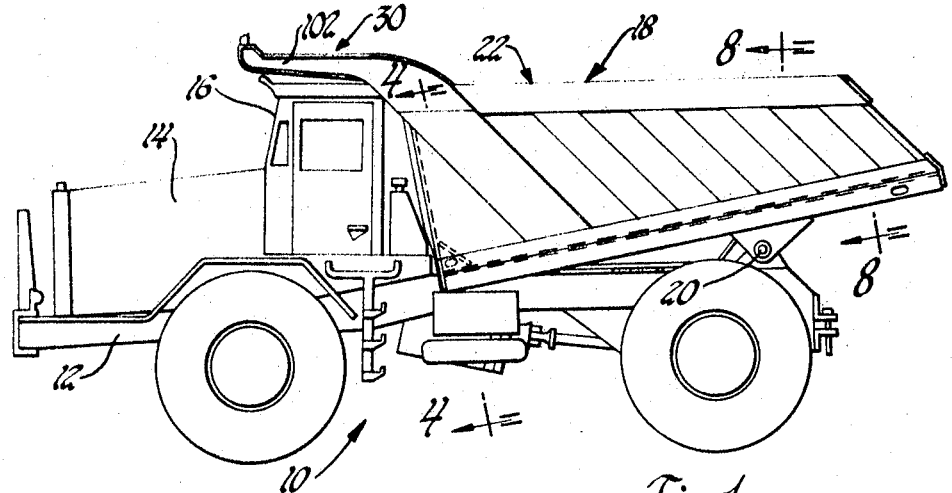
FIGURE 1 is an elevation view of a rear dump truck incorporating a dump body made in accordance with the invention.

Referring now to FIGURE 1, a rubber-tired off-highway rear dump vehicle 10 is shown comprising the usual frame 12, the forward portion of which includes an engine compartment 14 and an operator's cab 16. To the rear of the operator's cab 16, a dump body 18 made in accordance with the invention is provided. The dump body 18 is supported by the frame 12 for rearward pivotal movement in the usual manner by a pivotal connection 20 located adjacent the rear of the dump body. Thus, by expansion of suitably located hydraulic jacks, the forward portion of the dump body 18 is adapted to be raised clockwise about its pivotal connection with the frame 12 for dumping a load.

Figure 2:
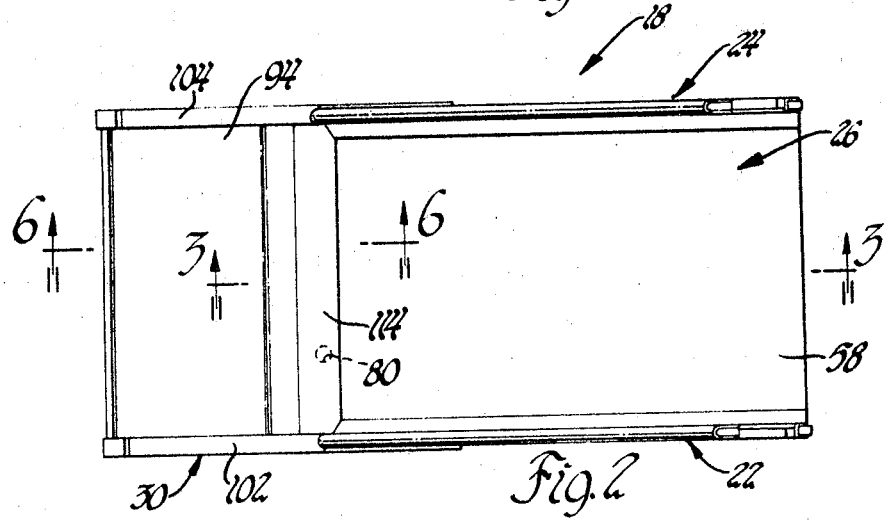
FIGURE 2 is a plan view of the dump body shown in FIGURE 1.
Figure 9:
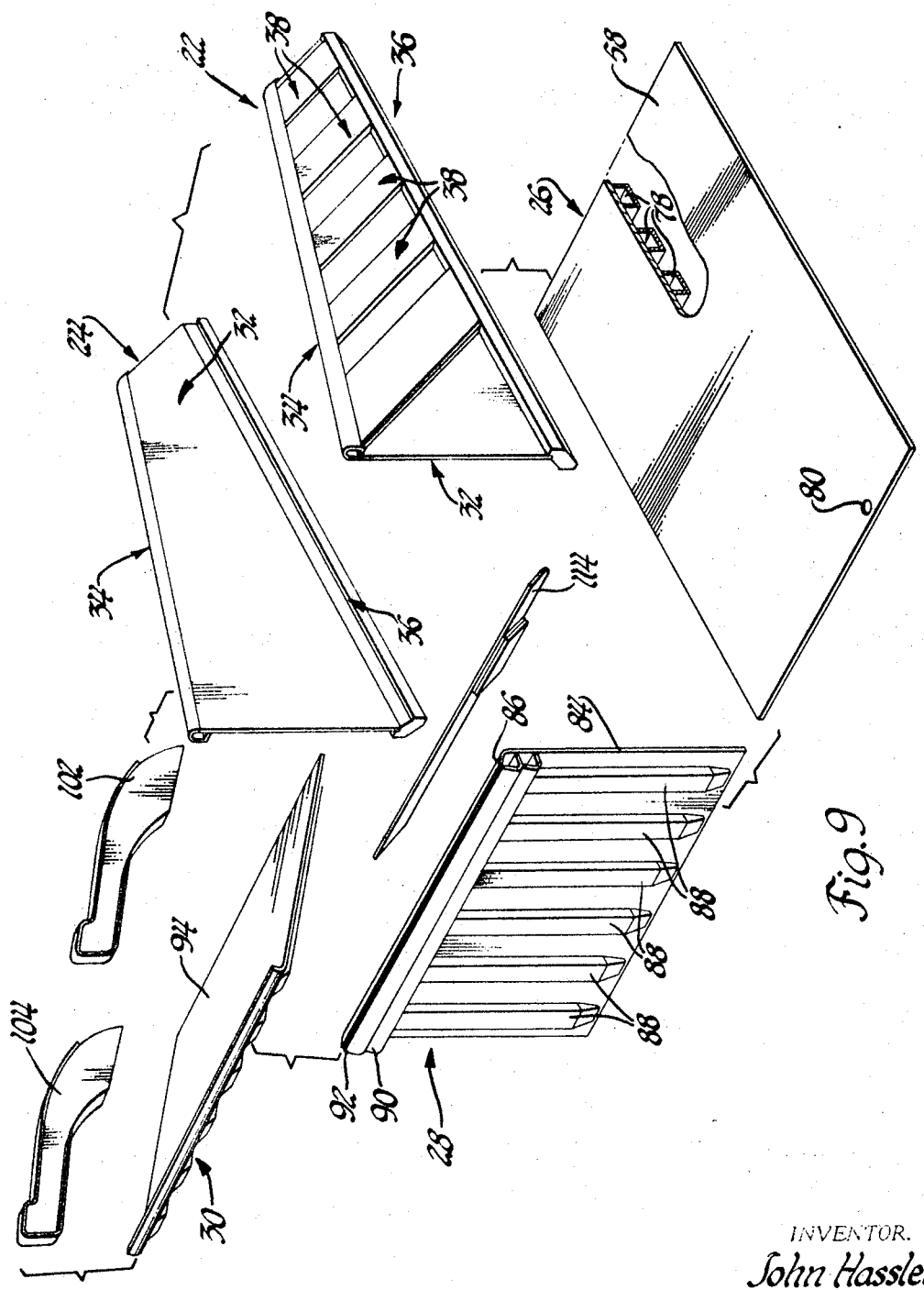
FIGURE 9 is an exploded perspective view showing the subassemblies that make up the dump body of FIGURE 1.

As seen in FIGURES 2 and 9, the dump body 18, in general, comprises a pair of laterally spaced vertical side walls 22 and 24, the lower ends of which are adapted to be rigidly attached to a floor portion 26. A front wall 28 is adapted to be connected to the forward end of the floor portion 26 and the side walls 22 and 24, and serves to complete the enclosure for retaining rock, sand, or other materials typically loaded into an off-highway dump vehicle. Attached to the upper end of the front wall 28 is a cab guard 30 that extends forwardly above the operator's cab 16 and serves as a protective shield which prevents boulders and the like from being dropped onto the cab and damaging the latter and/or the vehicle operator.

The side walls 22 and 24 are similar in construction, one being the mirror image of the other, and therefore corresponding numerals will be used to identify corresponding parts. Each side wall is intended to be made as a subassembly and prior to final assembly to the floor portion will consist of a side plate 32, top rail 34, corner beam 36, and a plurality of U-shaped stiffener members 38 as seen in FIGURE 9. Moreover, in the preferred form, the entire dump body 18 is made out of a lightweight metal such as aluminum or an aluminum alloy with both the top rail 34 and the corner beam 36 being extruded elongated members of uniform cross section throughout their length and serving as structural components for strengthening the body against the usual torsional and flexural stresses experienced thereby.

As seen in FIGURES 7 and 8, the corner beam 36 is formed in two parts that are joined together by welds 37 and 40 so as to form a unitary hollow structure. The corner beam 36 includes a pair of vertically spaced and parallel flat surfaces 42 and 44 and also a pair of parallel and horizontally spaced flat surfaces 46 and 48 which lie in planes substantially perpendicular to the plane of the surfaces 42 and 44. The surfaces 44 and 46 are connected by an inclined surface 50 while the surfaces 42 and 48 are similarly joined by an inclined surface 52. A pair of rabbets 54 and 56 are respectively formed at the juncture of surfaces 42, 52, and 48, 52, and provide locating surfaces for accurately accommodating the lower end of the plate 32 and a side edge of the floor plate 58. An arcuate well 60 is also formed in the beam 36 at the juncture of surfaces 42 and 46 and serves to accommodate a weld for fixing the lower outer end of the stiffener members 38 to the corner beam. A beveled surface 61 serves a similar function to be described hereinafter.

As aforementioned, the top rail 34 is an extrusion in the form of a beam and as viewed in FIGURE 9 takes the form of an inverted J in cross section. More specifically, the rail 34 has leg 62 integrally formed with a laterally extending arm 64. The curved part 66 of the rail terminates with a rabbet 68 which provides locator surfaces for the upper edge of the side plate 32.

Thus, in assembling a side wall, the top rail 34 is first positioned as seen in FIGURE 8 with its rabbet 68 accommodating the upper edge of the side plate 32 and with the arm 64 abutting an intermediate outer portion of the side plate. Straight-line welds 70 and 72 are then utilized for fixing the rail 34 to the side plate 32. Thereafter, the lower edge of the side plate is positioned in the rabbet or locator portion 54 of the corner beam 36 and welded thereto by a straight-line weld indicated by the numeral 74. The stiffener plates 38 are then positioned between the surface 42 and the rail 34, and fixed to the corner beam 36 by the weld 76 and to the side plate 32 by welds located at the juncture between the side plate and stiffener members.

Figure 3:
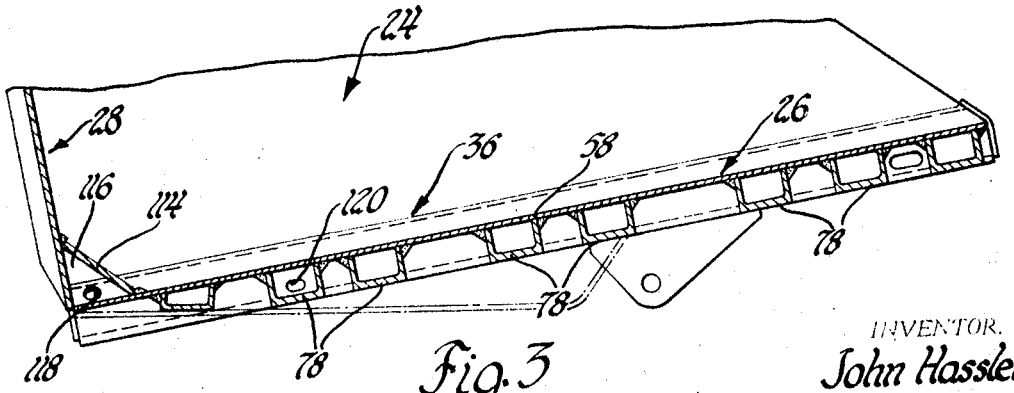
FIGURE 3 is an enlarged sectional view taken on line 3—3 of FIGURE 2 and showing in detail the floor construction.
Figure 4:
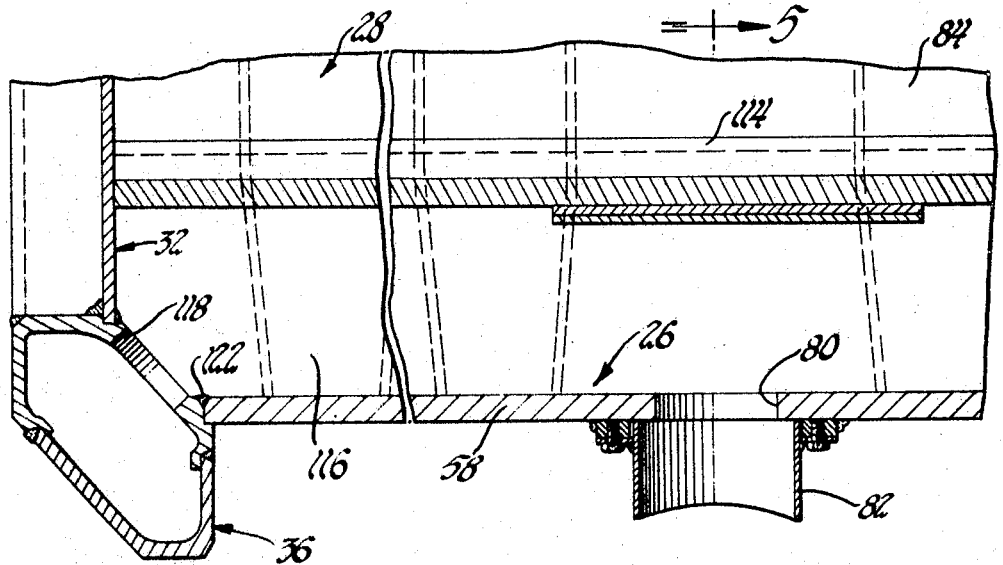
FIGURE 4 is a partial enlarged sectional view taken on line 4—4 of FIGURE 1.

The floor portion 26 which is adapted to be secured to the side walls 22 and 24 includes the main floor plate 58 which is rectangular in shape and of suitable thickness and width for supporting the load for which the body is job-rated. The underside of the floor plate 58 has welded thereto a plurality of transverse U-shaped floor channels 78 which are spaced longitudinally and located in parallel planes. Thus, as seen in FIGURE 3, all of the floor channels 78 are of identical cross sectional configuration except for the one located adjacent the front of the dump body 18 which has one leg thereof shortened. An opening 80 is provided in the floor plate 58 adjacent the front edge thereof and serves to communicate exhaust gases into the interior of the dump body through a pipe-like extension 82 which registers with the opening 80 and is secured to the underside of the floor plate as seen in FIGURES 4 and 5.

The front wall 28 also includes a main plate 84 of rectangular configuration, the upper end 86 of which is bent forwardly as seen in FIGURE 6. As in the case of the side walls 22 and 24 and the floor portion 26, a plurality of vertical U-shaped channel members or stiffeners 88 are spaced along the length of the main plate 84 and rigidly fastened thereto. A pair of formed angle members 90 and 92 extend transversely above the stiffener members 88 and are secured to the latter and to the plate 84, one above the other.

As aforementioned, a cab guard 30 is fastened to the front wall 28 and, as seen in FIGURE 6, comprises a flat main plate 94, the forward end 96 of which is curved upwardly and rigidly secured to a cab guard extension 98 which is also held in position by gusset plate means 100. A pair of end supports 102 and 104 is located on the opposite sides of the main plate 94 and secured thereto. Channel-shaped stiffeners 106 are secured to the underside of the main plate 94 and at the rearward end are welded to the upper formed angle member 92. The forward end of each stiffener member 106 is provided with an end cap 108 so as to complete the assembly. The attachment of the cab guard 30 to the front wall 28 is completed by the use of a pair of reinforcing plates 110 and 112, the former of which is welded to the top of the main plate 94 and the front of plate 84, while the latter is welded to the end supports 102 and 104 and the front end of the wall 28.

Figure 5:
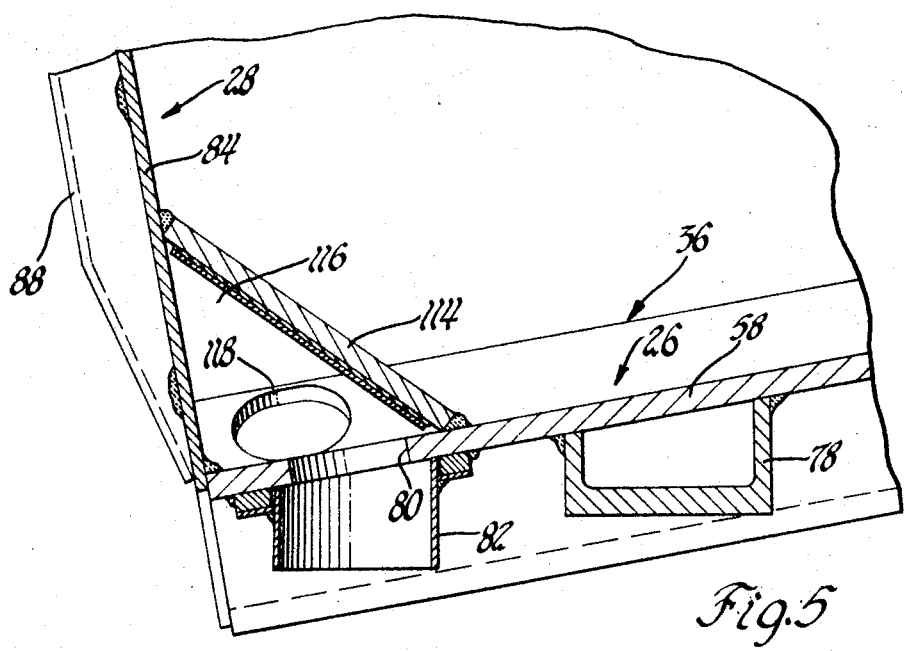
FIGURE 5 is a sectional view taken on line 5—5 of FIGURE 4.

As seen in FIGURE 5, the body 18 can be provided with a corner plate 114 which extends transversely across the front portion of a body and forms a conduit 116 for conveying exhaust gases to the corner beams 36, each of which is provided with an opening 118 at its forward end. Thus, the corner beams 36 also can serve as exhaust gas conduits for conveying gases to one or more of the floor channels 78 by simply boring holes 120 at appropriate locations as seen in FIGURE 3.

A dump body constructed in the manner described above provides a structure which can be built up in sub-assembly fashion at distant locations and brought to a common plant for final assembly. This is possible because of the unique method of construction of the side walls 22 and 24 which utilize the specially designed corner beams, described in detail above, having locating surfaces which permit accurate positioning of a floor portion and joining thereto. It should be apparent that once the side walls 22 and 24 are built up as aforedescribed, it is a simple matter to then take the floor portion 26 and weld the side edges of the main floor plate 58 directly to the associated corner beam 36 by simply placing the side edge of the plate 58 in the formed locating surface 54 provided in the corner beam. A straight-line weld 122 along this joint as well as a weld 124 between the floor channels 78 and the surface 44 of the corner beams 36 fixes the latter to the floor portion. Once the side wall subassemblies are secured to the floor portion, it is a simple matter then to weld the front wall 28 and the cab guard 30 to complete the body.

Various changes and modifications can be made in this construction without departing from the spirit of the invention. Such changes and modifications are contemplated by the inventor and he does not wish to be limited except by the scope of the appended claims.

I claim:

1. In combination with a vehicle, a dump body pivotally mounted thereon comprising a pair of laterally spaced side walls, a floor portion, each of said side walls and said floor portion comprising a metal main plate, a longitudinally extending metal corner beam connecting each of the side walls to the floor portion, said corner beam having a pair of spaced rabbets formed therein providing locating surfaces, formed therein, one for accommodating one edge of the main plates associated with the side wall and the other accomodating one edge of the main plate of the floor portion so as to provide a straight-line connection between the members, said main plates being fixedly secured to said corner beam.

2. The combination of claim 1 wherein the side wall and floor portions have U-shaped stiffener members welded thereto.

3. The combination of claim 1 wherein the corner beam comprises a pair of elongated extruded sections welded together to form a rigid member.

4. The combination of claim 2 wherein said corner beam has a flat face adjacent each locating surface that serves to support one end of the stiffener members.

5. In combination with a vehicle having an engine, a dump body supported by said vehicle for movement about a transverse horizontal axis, said dump body comprising a pair of laterally spaced metal side plates, a metal floor plate, a metal corner beam connecting each of the side plates to the floor plate, a front plate fixed to the side plates and the floor plate, transverse stiffener members secured to the floor plate and having each end thereof joined to the corner beam, upright stiffener members fixed to the outside of each side plate and having the lower end thereof joined to the corner beam, and a rail fixed to the upper end of the upright stiffener members and to the side plate, said corner beam having a pair of spaced rabbets formed therein providing locating surfaces accommodating the longitudinally extending edges of the associated side plate and floor plate and fixedly secured together.

6. The combination of claim 5 wherein a cab guard is secured to the front plate.

7. The combination of claim 5 wherein said transverse and upright stiffener members are U-shaped in cross section.

8. The combination of claim 5 wherein said corner beam serves as a conduit for exhaust gases emanating from said engine.

9. The combination of claim 8 wherein an aperture is formed in said corner beam for communicating exhaust gases to one of said transverse stiffener members.

10. The combination of claim 5 wherein said corner beam is an extrusion of uniform cross section throughout its length and said locating surfaces formed thereon are provided by a pair of rabbets which are vertically and horizontally spaced from each other.

11. The combination of claim 10 wherein an inclined surface formed on said corner beam joins the rabbets formed thereon.

References Cited

UNITED STATES PATENTS

| | | | |
|---|---|---|---|
| 1,554,172 | 9/1925 | Nesmith | 105—418 |
| 2,207,361 | 7/1940 | Thompson | 105—418 |
| 2,869,140 | 1/1959 | Wiedemann. | |
| 2,925,301 | 2/1960 | Milligan | 298—17 |
| 2,974,997 | 3/1961 | Parsley | 298—17 X |
| 3,208,790 | 9/1965 | Domes | 296—28 |
| 3,246,794 | 4/1966 | Marshall | 29—482 X |
| 3,331,433 | 7/1967 | Haberg | 296—28 X |
| 3,363,933 | 1/1968 | Wilson | 296—28 |

RICHARD J. JOHNSON, Primary Examiner

U.S. Cl. X.R.

52—731; 105—418; 298—1